Dec. 19, 1967     E. KULTSAR     3,358,678
MOVING AND SUPPORT SYSTEM FOR THE HUMAN BODY
Filed July 29, 1964     13 Sheets-Sheet 4

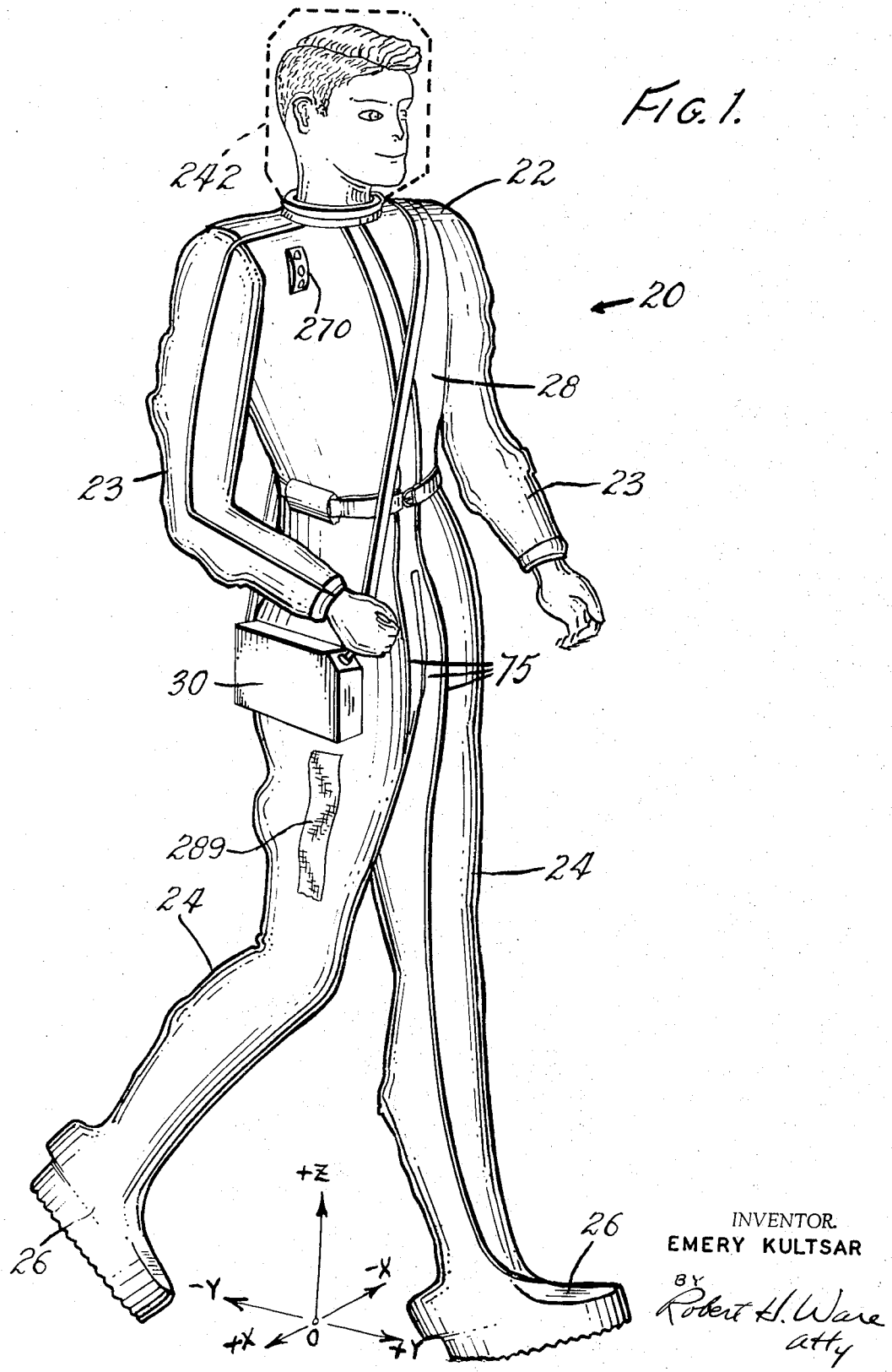

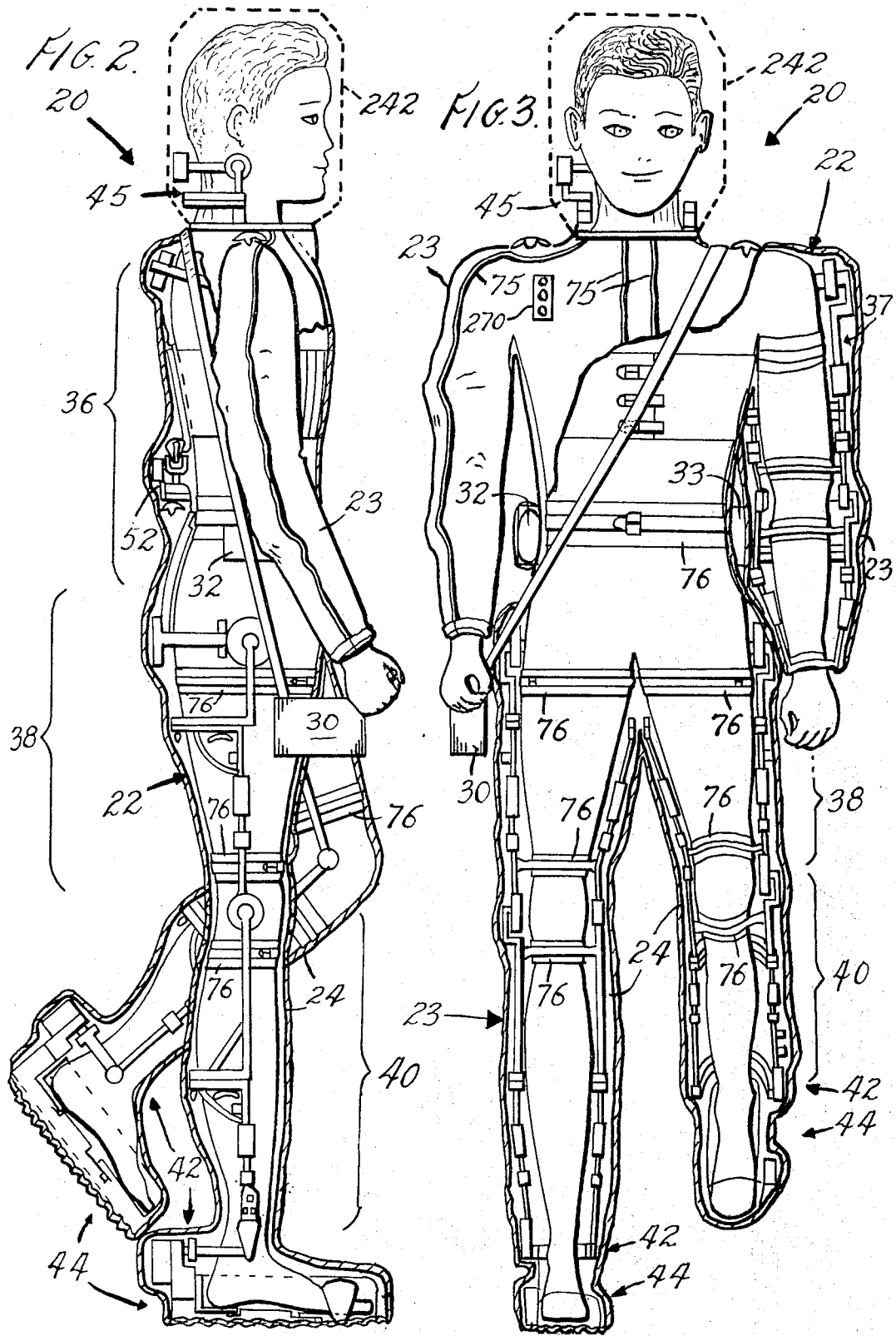

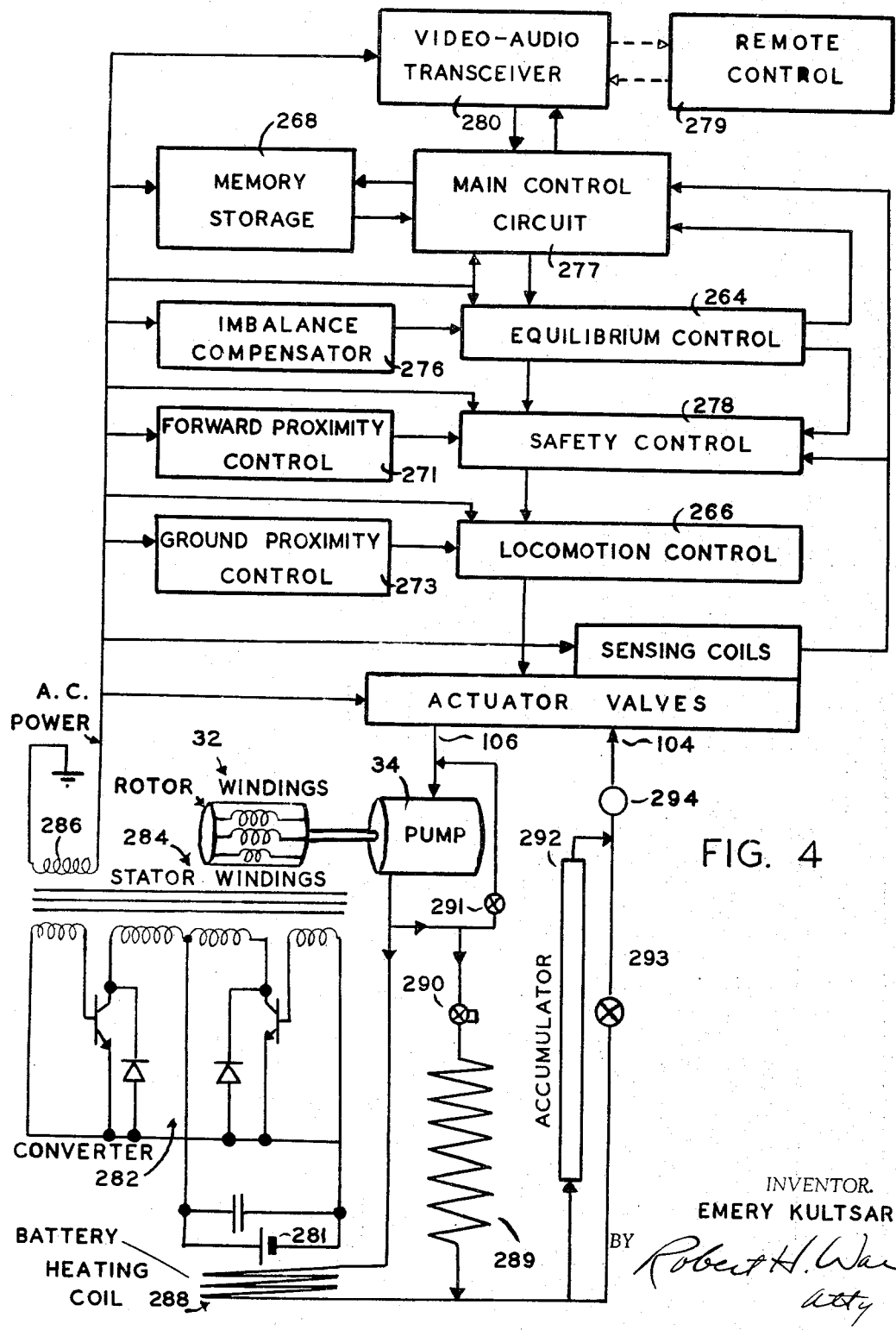

INVENTOR.
EMERY KULTSAR
BY Robert H. Ware
atty

Dec. 19, 1967   E. KULTSAR   3,358,678
MOVING AND SUPPORT SYSTEM FOR THE HUMAN BODY
Filed July 29, 1964   13 Sheets-Sheet 6

INVENTOR.
EMERY KULTSAR
BY Robert H. Ware
atty

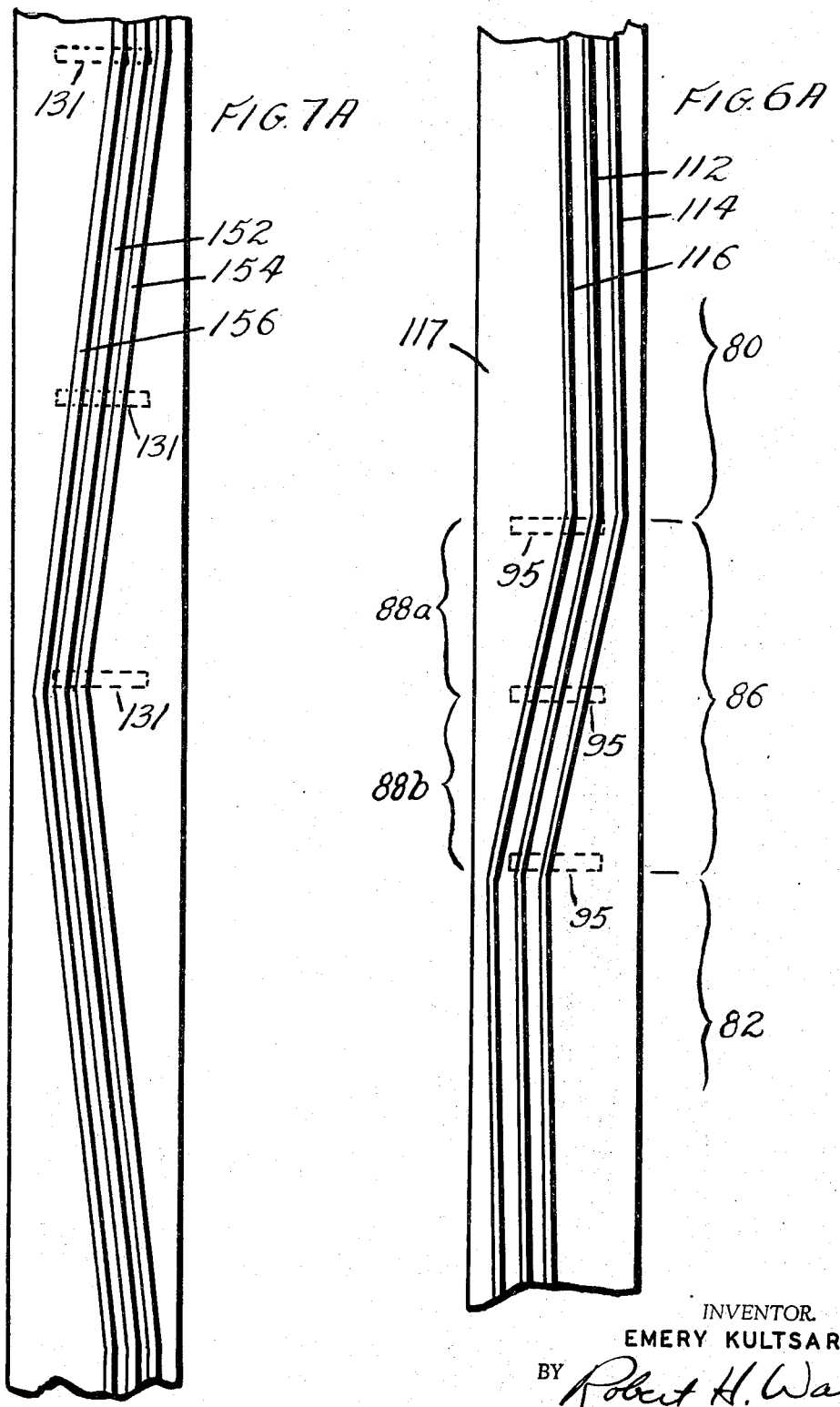

INVENTOR.
EMERY KULTSAR
BY Robert H. Ware
atty

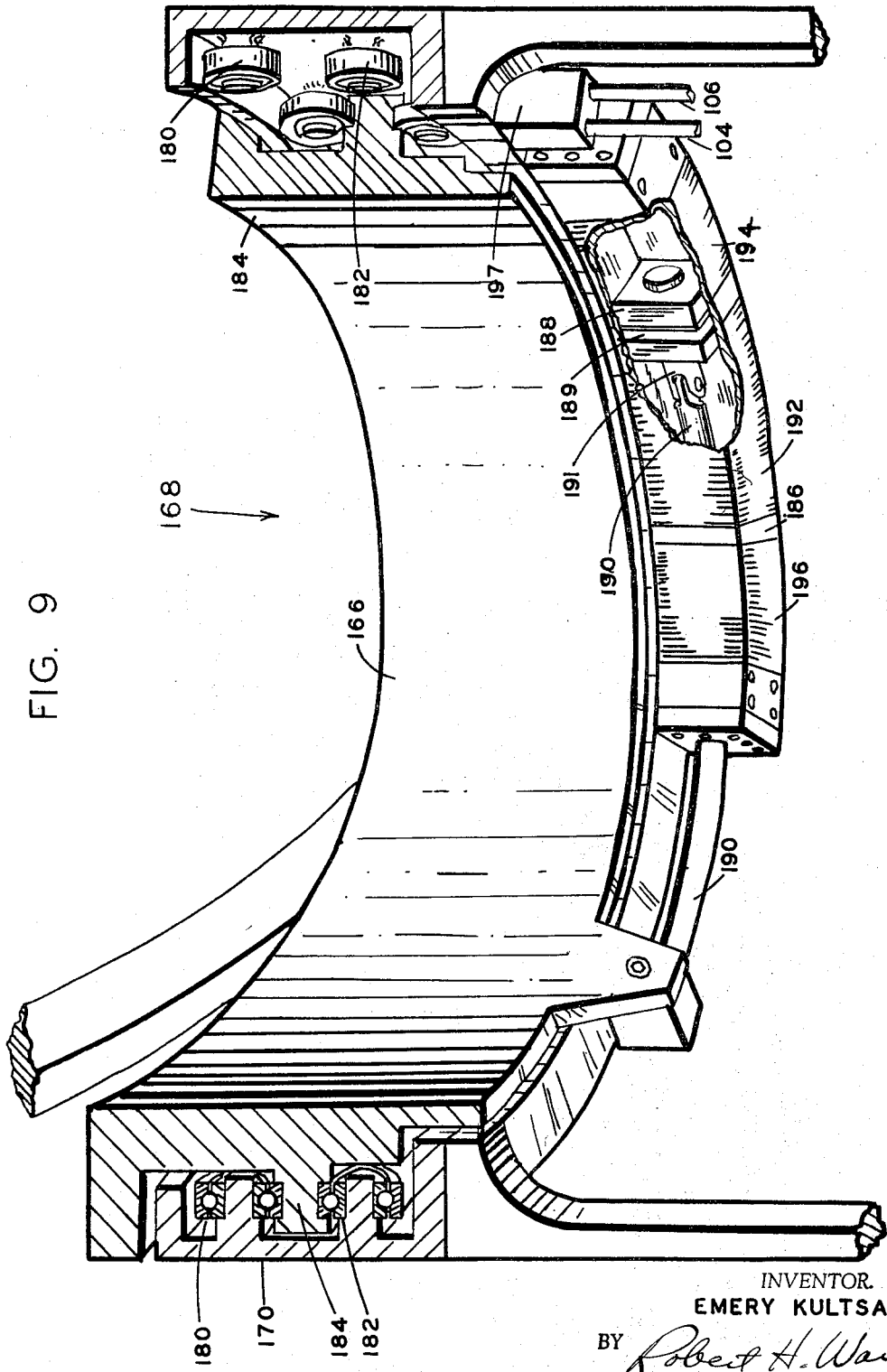

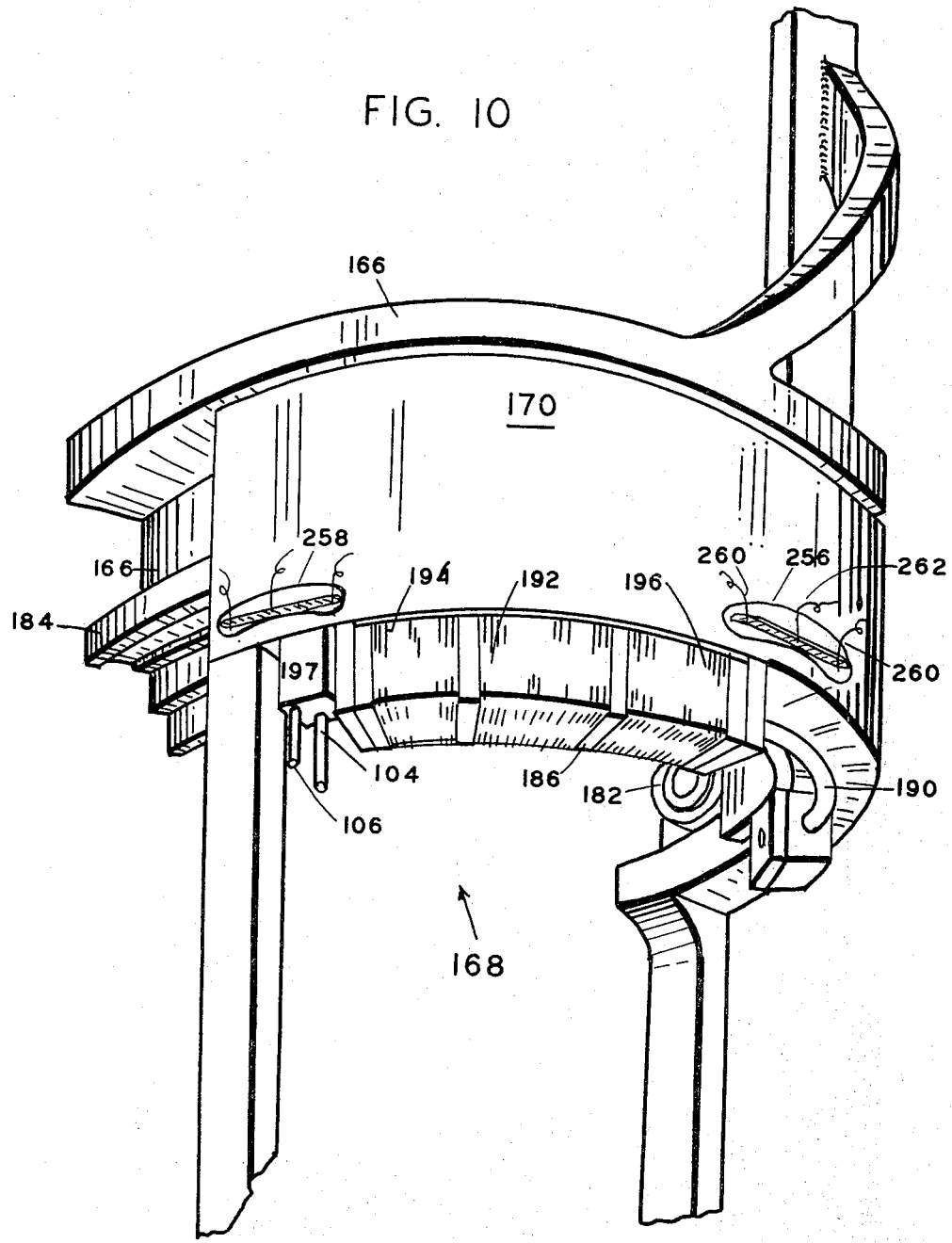

Dec. 19, 1967   E. KULTSAR   3,358,678
MOVING AND SUPPORT SYSTEM FOR THE HUMAN BODY
Filed July 29, 1964   13 Sheets-Sheet 11
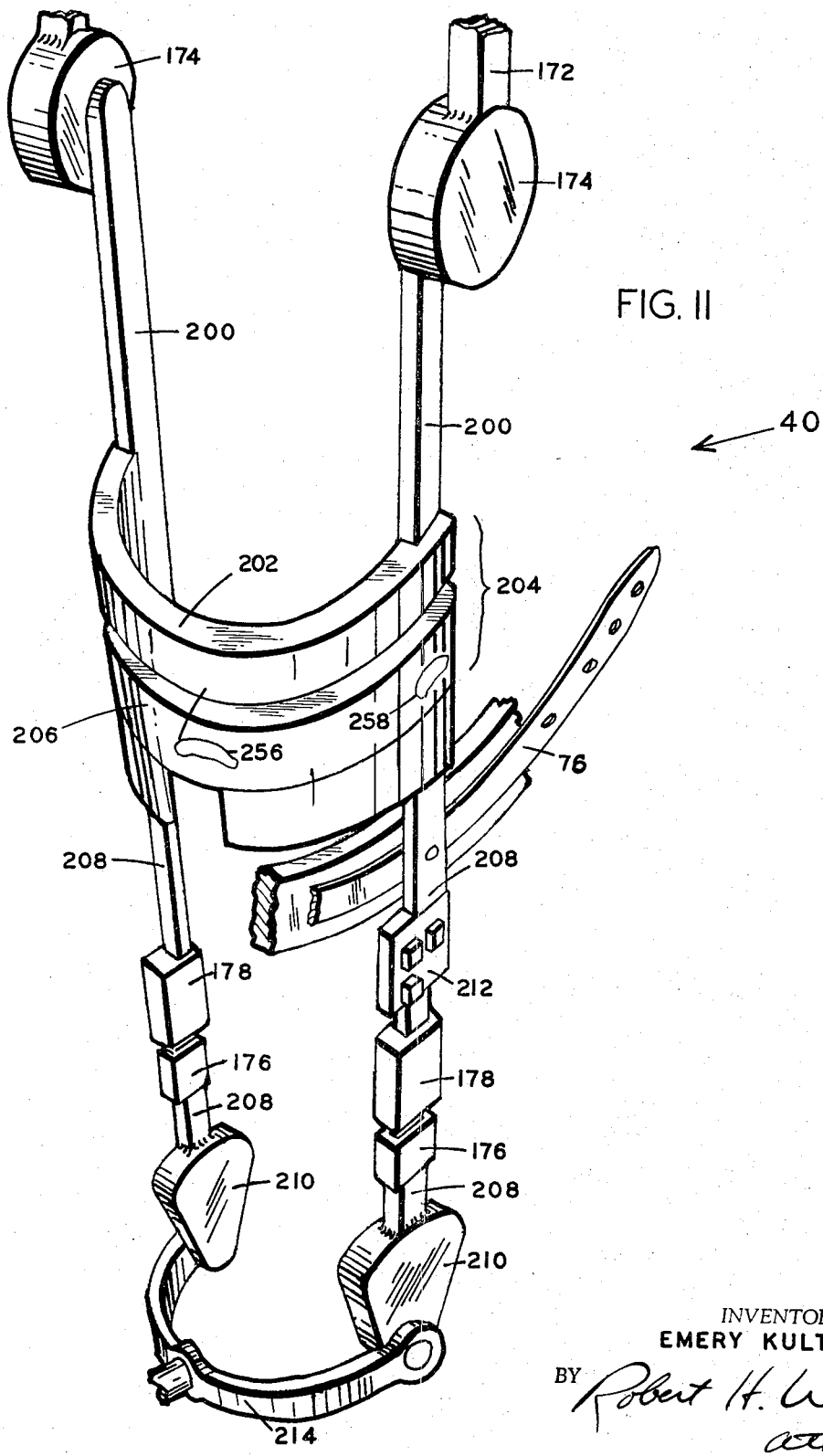
FIG. II
INVENTOR.
EMERY KULTSAR
BY Robert H. Ware
atty

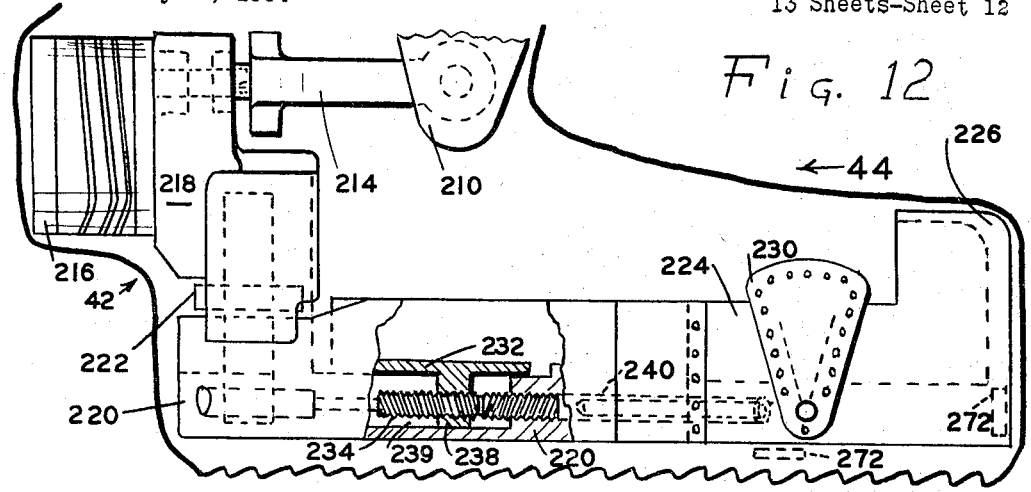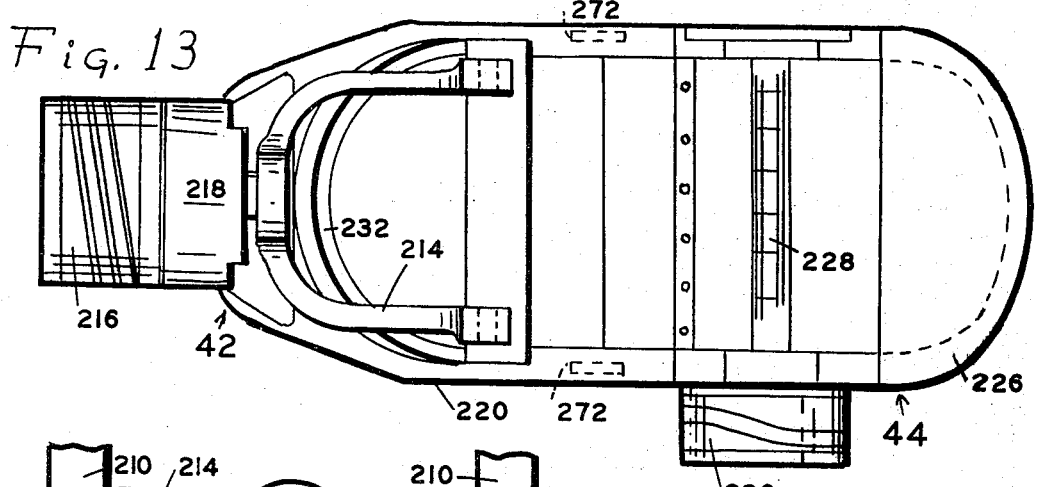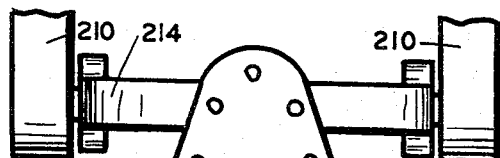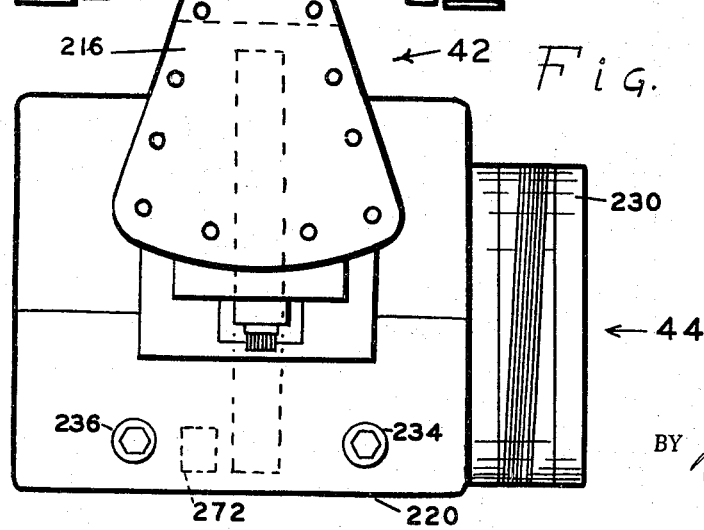

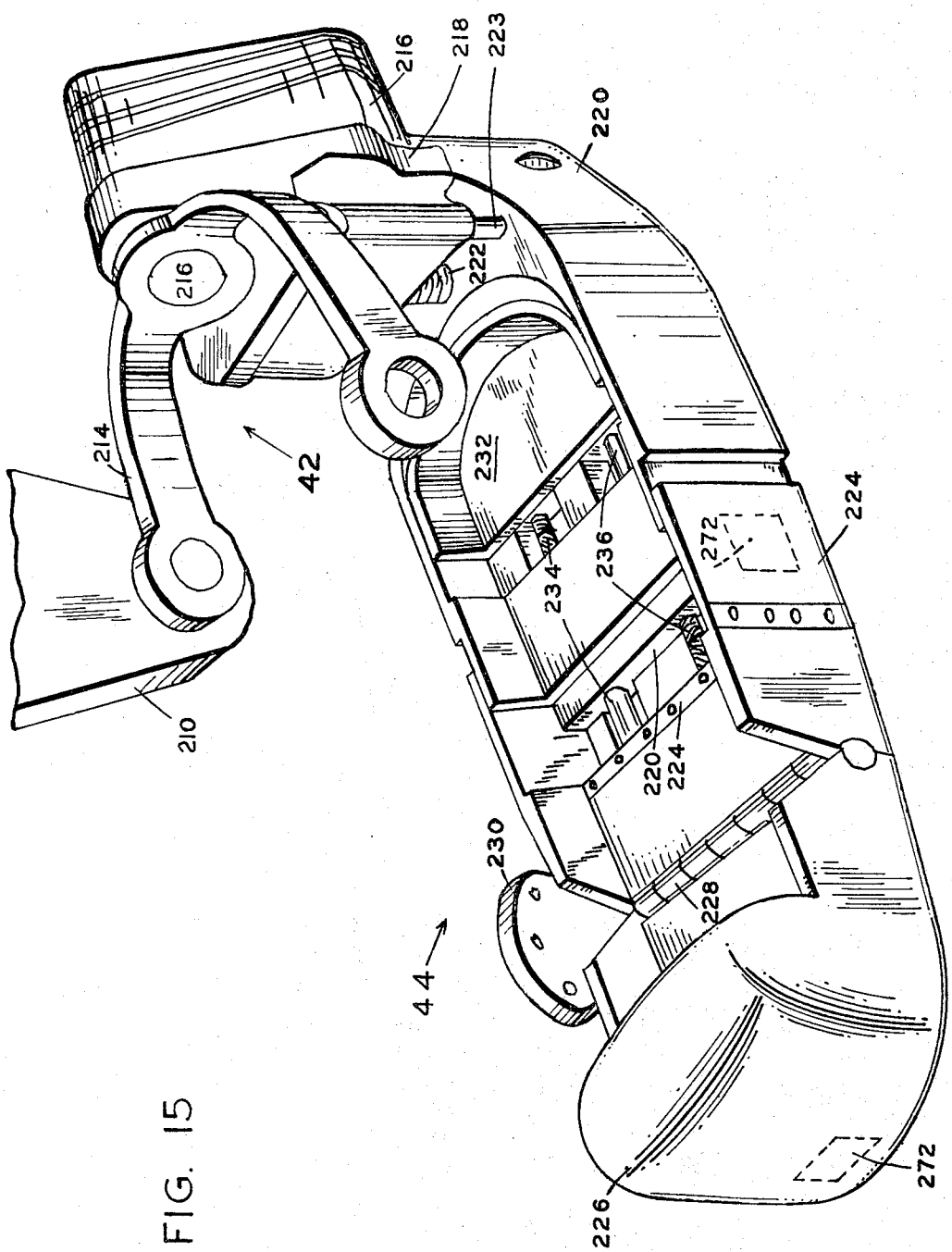

United States Patent Office 3,358,678
Patented Dec. 19, 1967

3,358,678
MOVING AND SUPPORT SYSTEM FOR THE HUMAN BODY
Emery Kultsar, Cross Highway,
West Redding, Conn. 06896
Filed July 29, 1964, Ser. No. 386,094
22 Claims. (Cl. 128—25)

ABSTRACT OF THE DISCLOSURE

Self-contained, self-powered personnel support systems providing upright structural support, upright equilibrium, and enhanced or supplemental powered actuation of the wearer's limbs and extremities to aid his locomotion, with an outer suit enclosing an articulated structural framework supporting all parts of the wearer's body, having powered actuators providing articulated motion thereof, controlled by programmed memory storage circuits through control circuitry governed by local or remote selective controls augmented by balance and proximity sensing systems to assure the wearer's equilibrium, safety and effective movement regardless of his physical condition.

BACKGROUND OF THE INVENTION

This invention relates to mechanisms, apparatus and control units assembled in personnel-support systems providing the user with enhanced capability to stand erect and maintain his equilibrium against outside forces tending to upset that equilibrium, and also providing enhanced ability to walk forward normally, to take steps backward or sideways, to walk up or down steps and over rough or irregular terrain, all while maintaining his equilibrium.

The systems of this invention incorporate self-contained power supply units, memory programming and control systems which may be governed manually by the user or remotely by way of radio or other control signals emanating from a distant control point. Automatic equilibrium sensing units are incorporated, to enable the programmed control system to maintain the wearer's equilibrium automatically.

In hazardous occupations, men are often required to enter environments presenting serious risks and hazards of disablement or loss of function. In the fighting of fires in buildings, forests and on shipboard for example, firefighting personnel are normally protected by asbestos suits and gas masks of various kinds, but no provision is made in such equipment for support and rescue of a man overcome by smoke or pinned down by falling debris, trees or wreckage resulting from explosions. Individuals may be completely disabled or unconscious as a result of such conditions, and if they are unable to help themselves quickly, they may soon become casualties as a result of fire, subsequent explosions, or additional fallen wreckage.

Underground and surface mining operations and exploring expeditions provide similar and additional hazards to personnel from unexpected disabling events preventing individuals from functioning normally, such as cave-ins, explosions, landslides and the like.

Individuals active in such hazardous environments thus require support systems capable of supplementing, enhancing or entirely replacing some or all of the muscular motor functions and the normal control functions of their central nervous systems, particularly when individuals are rendered unconscious in emergency situations.

Accordingly, a principal object of the present invention is to provide systems, methods and apparatus for personnel support, protection and rescue in hazardous environments.

A further object of the invention is to provide such systems affording one or more of the functions of providing upright structural support for the individual; maintaining his equilibrium against the action of external unbalancing forces; providing movement of limbs and body members by powered and controlled movement of a supporting articulated structural framework; assisting a disabled or unconscious individual to escape from the hazardous environment by enabling him to walk in a substantially normal manner over any terrain; providing automatic programmed memory control systems for actuating one or more of the foregoing functions; or providing local, remote or co-operating dual control systems capable of directing the operation of the various sub-assemblies which combine to form the systems of this invention.

Other and more specific objects will be apparent from the features, elements, combinations and operating procedures disclosed in the following detailed description and shown in the drawings, in which:

THE DRAWINGS

FIGURE 1 is a perspective view of an individual wearing a protective suit incorporating a system embodying the present invention;

FIGURES 2 and 3 are side and front views of the individual wearing the suit shown in FIGURE 1, shown partially broken away to reveal the position and co-operation of the various sub-assemblies forming the system of the present invention;

FIGURE 4 is a schematic block diagram illustrating the control and associated systems incorporated in the present invention.

The remaining figures show detailed views of the various assemblies and sub-assemblies incorporated in the system of FIGURES 1–4.

Figure 5:
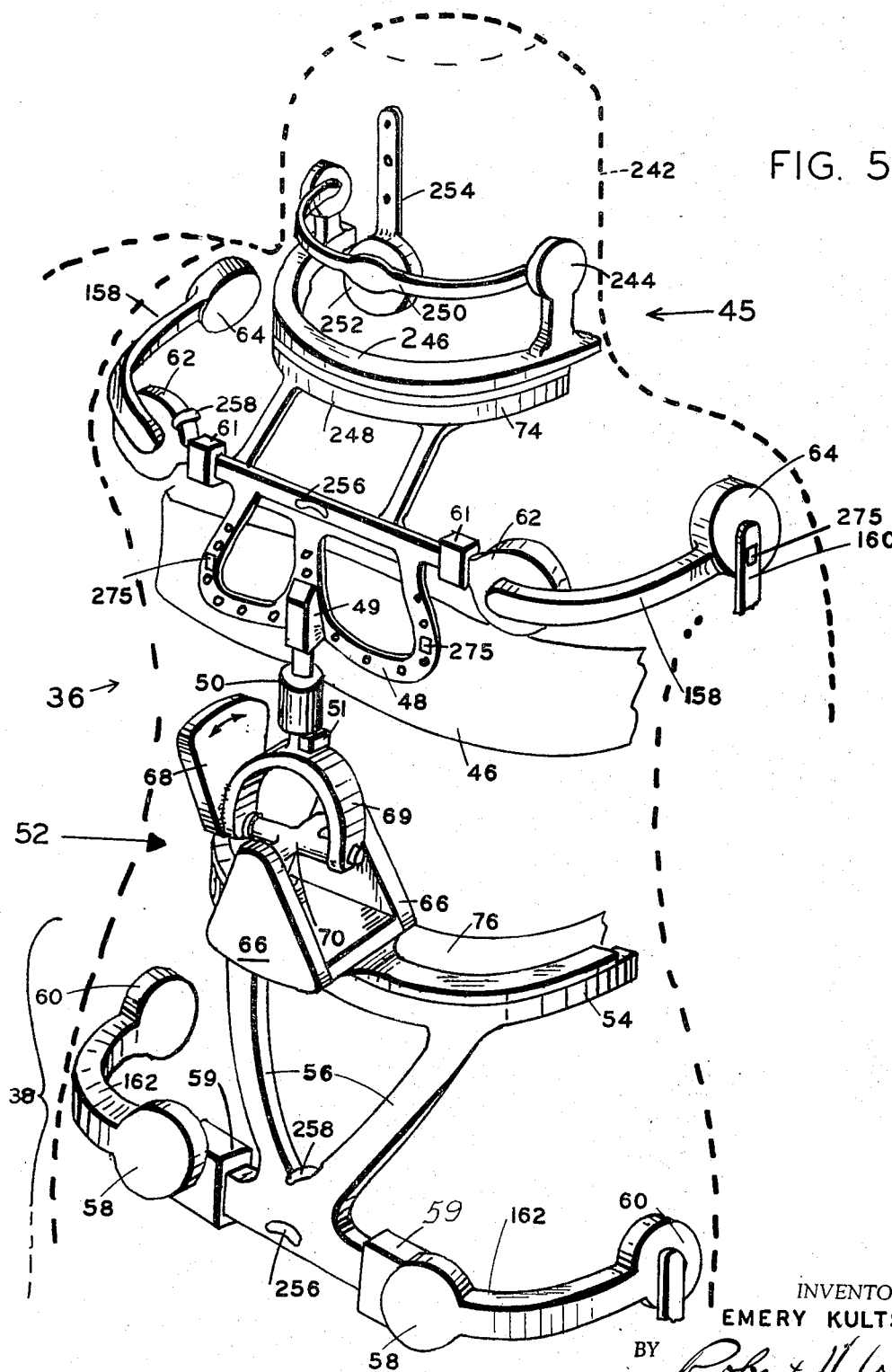
Figure 6:
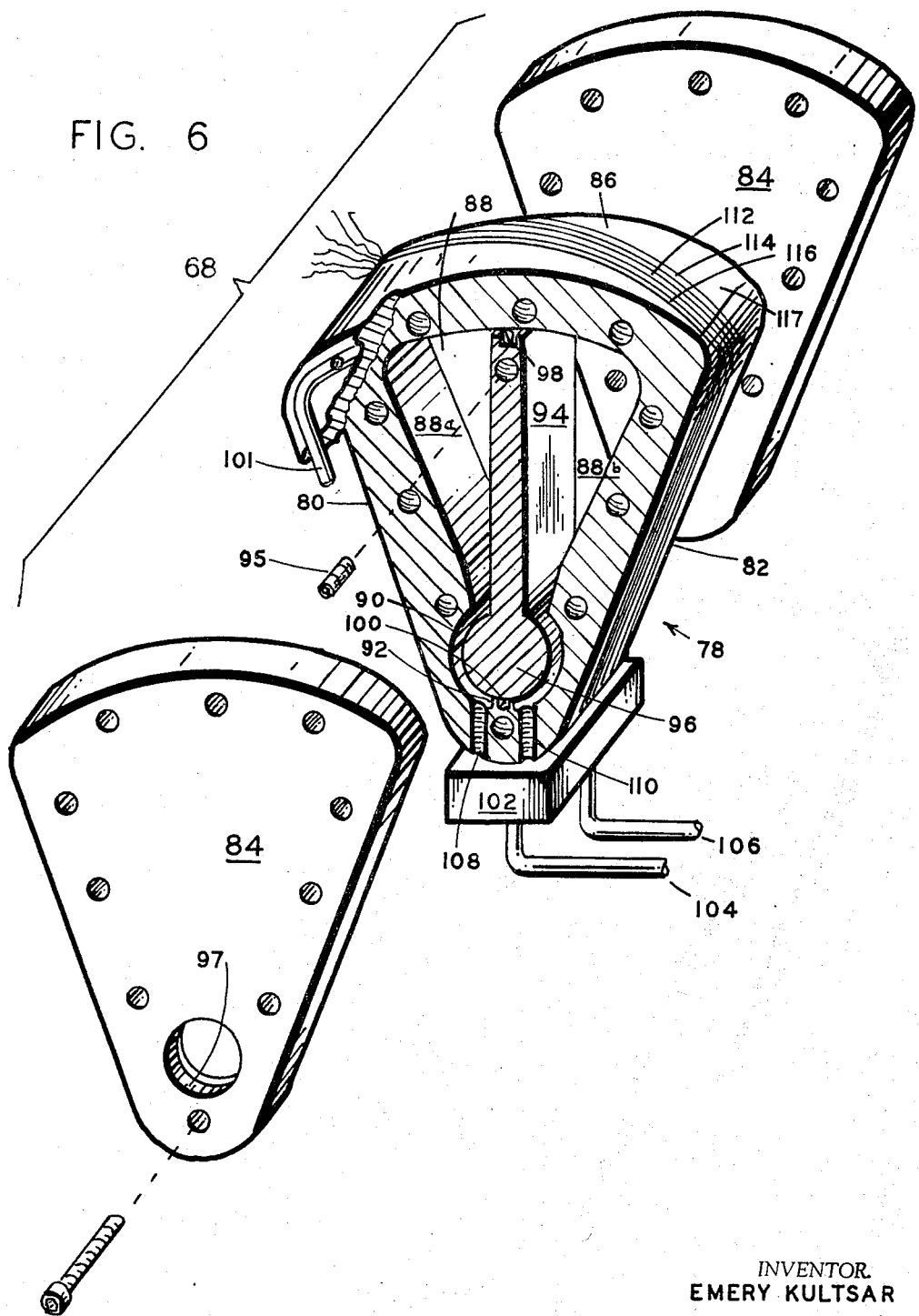
Figure 7:
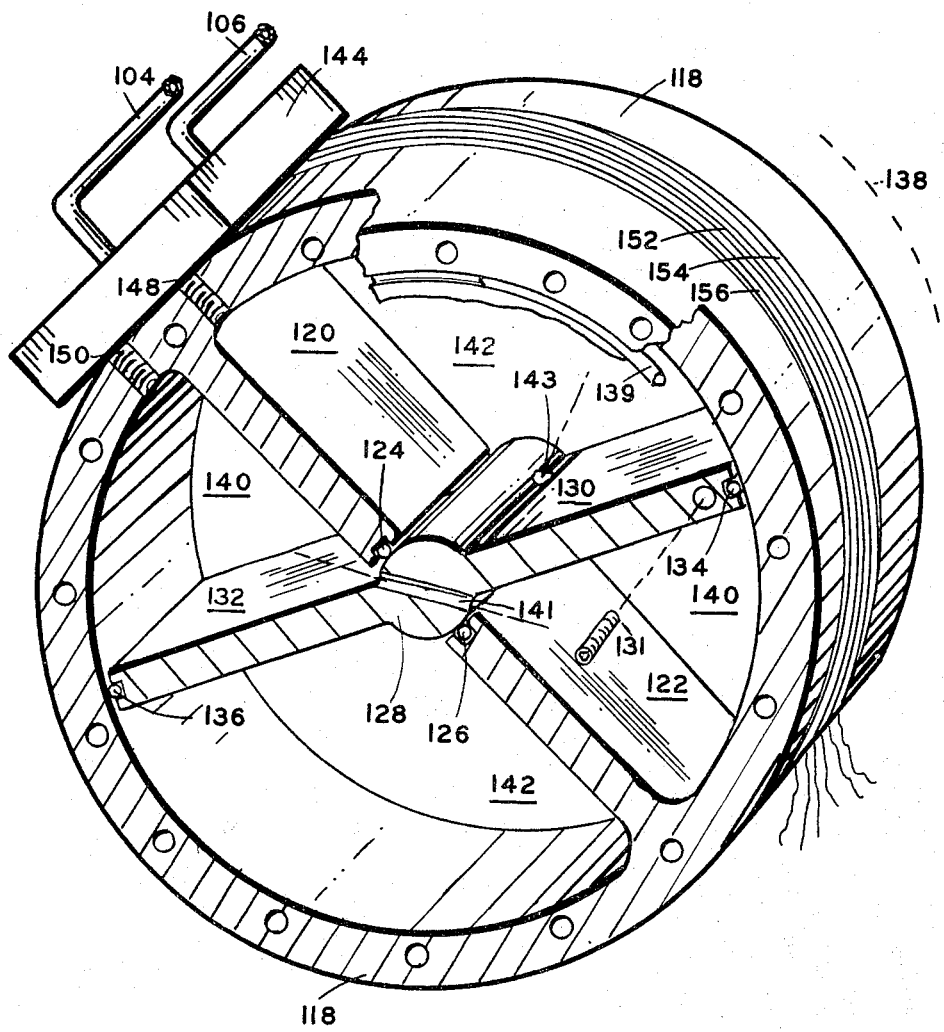
Figure 8:
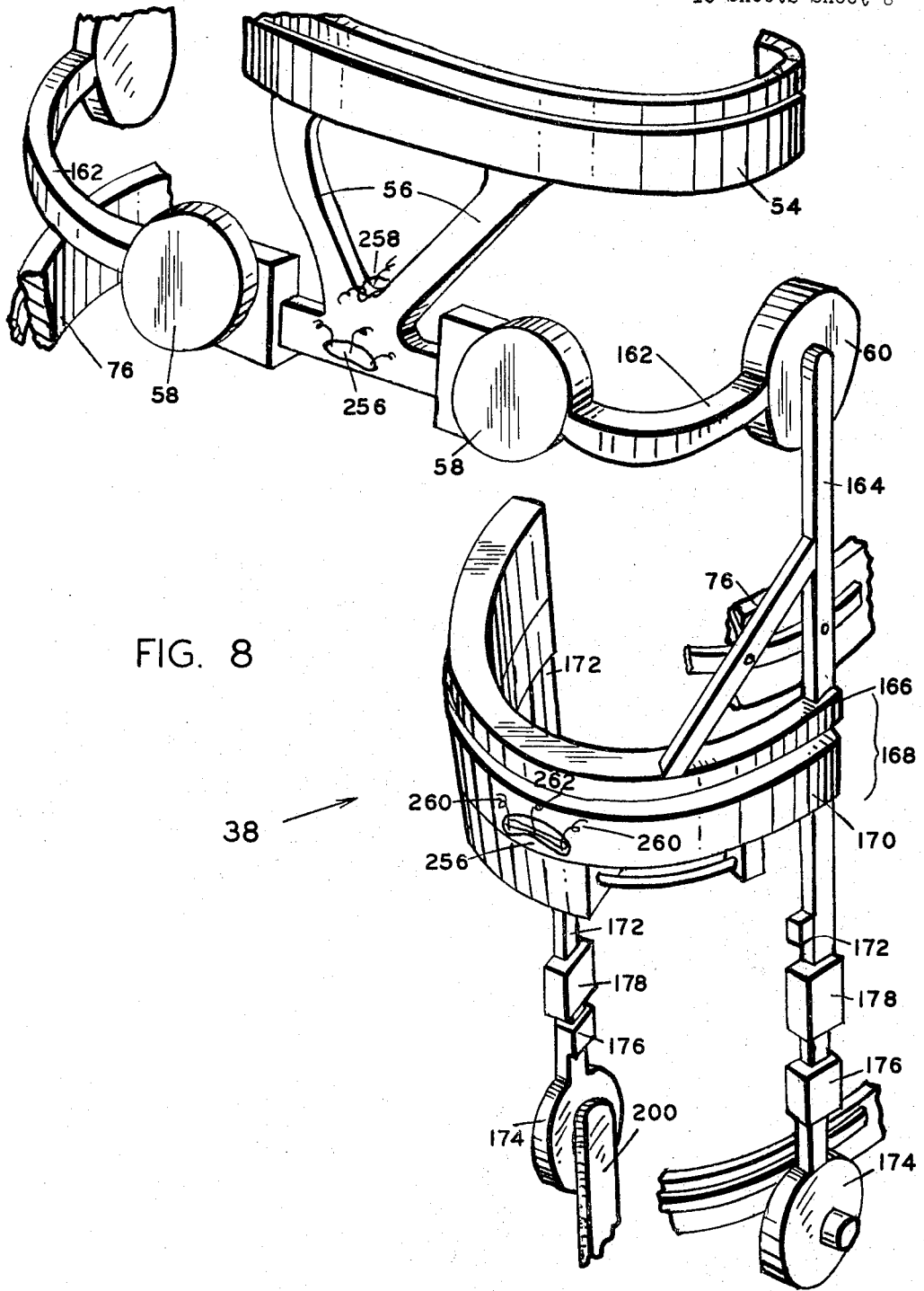

FIGURE 5 is a perspective view of the torso assembly;

FIGURE 6 is a cut-away perspective view of a sector actuator employed in the torso assembly of FIGURE 5;

FIGURE 7 is a cut-away perspective view of a pivotal actuator also incorporated in the torso assembly of FIGURE 5;

FIGURES 6a and 7a are developed views of sensing coil bands surrounding the peripheries of the actuators of FIGURES 6 and 7 respectively;

FIGURE 8 is a perspective view of the hip and thigh assembly connected to the torso assembly shown in FIGURE 5;

FIGURE 9 is a cut-away perspective view of an angular actuator also incorporated in the hip and thigh assembly of FIGURE 8;

FIGURE 10 is a rear bottom perspective view of the angular actuator of FIGURE 8;

FIGURE 11 is a fragmentary perspective view of the knee and calf assembly connected to the hip and thigh assembly of FIGURE 8;

FIGURES 12, 13 and 14 are respective side, top and rear views of the ankle and foot assembly connected to the knee and calf assembly of FIGURE 11;

FIGURE 15 is a perspective view of the ankle and foot assemblies as shown in FIGURES 12–14.

SUMMARY OF THE INVENTION

In the overall perspective view of FIGURE 1, a suit 20 incorporating the features of the present invention is shown in use. The suit 20 incorporates an outer jacket 22 having integral arm portions 23, leg portions 24 terminating in foot portions 26 and a torso portion 28 enclosing the body of the wearer and forming with the leg portions 24 an integral coverall-type suit having a structural framework supporting both the suit and the wearer, who normally controls the operation of this automated system by operation of a simple control unit 30 carried on the belt, or on a shoulder strap as in FIGURE 1.

As indicated in the schematic block diagram of FIGURE 4, the control unit 30 and associated control systems in the suit 20 incorporate all control and memory units required for either local or remote actuation of the system. Power supply and hydraulic actuation systems are mounted directly in or on the suit. In FIGURE 3, the power supply unit 32 and the hydraulic pump 33 are indicated schematically, mounted on the belt.

The principal power-actuated structural sub-assemblies of the articulated, self-contained system of the present invention are illustrated in FIGURES 2 and 3 respectively, showing these sub-assemblies from the front and from the side, and indicating their co-operation to form a complete system. These sub-assemblies include the fully articulated torso assembly 36, the arm assembly 37, the hip and thigh assembly 38, the knee and calf assembly 40, the ankle assembly 42, the foot assembly 44, and the head and neck assembly 45, all shown in FIGURES 5–15 and described in detail hereinafter. Each of these assemblies includes one or more reversible-acting actuators of the kind shown in FIGURES 6 and 7, preferably powered by hydraulic fluid under substantial pressure, which is conveyed to each of the assemblies by flexible tubing and by conduits formed internally in the structural members of the assemblies themselves. The pressurized fluid is directed to move and position the actuators by control valves whose condition is governed by the control system.

The actuators of FIGURES 6 and 7 provide pivoting movement as required to enhance and assist the normal universal motion of the ball-and-socket joints of the wearer's shoulders, hips, and knees.

The arm, torso, thigh and calf assemblies also include arcuate angular actuators (FIGURES 9 and 10) having curved tracks engaged for relative movement to provide twisting motion of the wearer's arms, torso and legs.

*Torso assembly*

The rear perspective view of FIGURE 5 illustrates the construction and operation of the torso assembly 36, which is movably joined to the head assembly 45 by the angular neck actuator 74 and to the hip and thigh assembly 38 by the similar angular waist actuator 54, as shown in FIGURE 5. The articulating linkage members co-operating to form torso assembly 36 include a cushioned chest band 46 removably secured around the wearer's chest, a light-weight structural anchor plate 48 secured by rivets or the like to chest band 46 and supporting the angular neck actuator 74, a universal pivot assembly 52 joined to the angular waist actuator 54, and an extension cylinder 50 joining the pivot assembly 52 to the anchor plate 48.

A light-weight rear frame 56 joins angular waist actuator 54 to the lower assemblies by means of outward pivotal hip actuators 58 and forward pivotal hip actuators 60.

Similar pairs of actuators join the arm assemblies 37 to the torso assembly 36, and these include outward pivotal shoulder actuators 62 and forward pivotal shoulder actuators 64.

Assemblies 36, 37, 38, 40 and 42 are firmly secured to cradle the wearer, with his shoulders placed between the forward pivotal shoulder actuators 64, his neck placed within the angular neck actuator 74, and his waist fitting within the angular waist actuator 54. All of these structures are positioned to the rear and to the sides of the wearer, allowing him free access from the front of the assembled suit, which is provided with zippers 75 as shown in FIGURE 1.

Free front access is provided by the thigh, calf and foot assemblies as described hereinafter, and the various assemblies are firmly secured to the wearer's limbs and torso by cushioned straps 76 and by cushioned chest band 46 secured to the anchor plate 48 of the torso assembly.

The angular actuators 54 and 74 each incorporate upper and lower circular arc-shaped track members having the same radius of curvature about a common axis, slidably joined together for relative angular movement about the common axis, and actuated by self-contained hydraulic piston-cylinder assemblies, all as shown in more detail in FIGURES 9 and 10.

Accordingly, relative sliding movement of the two track members of angular waist actuator 54 produces "swiveling" of the hips of the articulated framework, and similar relative movement of the two track members of the angular neck actuator 74 produces "swiveling" movement of the head assembly 45. The wearer's body is held securely within the structural framework of the present invention, and he thus may swing his waist or his head sidewise by actuation of the self-contained hydraulic cylinders incorporated in the angular actuators 54 and 74.

*Pivot assembly*

The torso assembly 36 provides forward bending of the torso through the operation of the pivot assembly 52 in conjunction with the extension cylinder 50, respectively secured to the angular waist actuator 54 and the anchor plate 48 supporting the angular neck actuator 74. The pivot assembly 52 includes two sidewise sector back actuators 66 and at least one forward sector back actuator 68.

*Sector actuators*

The actuators 66 and 68 are formed as shown in FIGURE 6, with an external casing 78 including radial sidewalls 80 and 82 and end walls 84, with both end walls having been exploded to illustrate the internal construction of the actuator. The casing is closed with an arcuate rim wall 86 joining the other walls 80, 82 and 84 to form a sector pie-shaped cavity 88 inside the actuator, terminating at its narrow end in a semicylindrical recess 90 subdivided at its terminal region by an inwardly protruding rib 92. Movably positioned within the cavities 88–90 is a pivoting vane 94 integrally joined to a pivot shaft 96 having one end journalled in a suitable bearing recessed in one end wall 84, and the other end of shaft 96 passing through a packed fluid-tight bearing 97 positioned in the other end wall 84.

Pivoting vane 94 is provided with a seal 98 extending around its periphery in sliding contact with the interior surfaces of end walls 84 and rim wall 86, and a similar seal 100 is provided along the inner face of rib 92 in sliding contact with the periphery of the pivot shaft 96. The vane 94, shaft 96 and the seals 98 and 100 thus divide cavity 88–90 into the two separate radial portions 88a and 88b shown in FIGURE 6. A gasket seal 101 surrounds the rim of casing 78 facing end walls 84, sealing cavity portions 88a and 88b. An electrically actuated proportioned valve unit 102 is connected to a hydraulic pressure conduit 104 and a hydraulic exhaust conduit 106, and these conduits are alternately connected through the valve 102 to ports 108 and 110 passing through the actuator casing 78 on opposite sides of rib 92 and thus respectively communicating with the two opposed sections 88a and 88b of cavity 88–90, alternately exposing the opposite sides of vane 94 to the hydraulic pressure supplied by the system, and thus causing pivoting angular movement of vane 94 about the axis of its pivotal shaft 96, controlled by actuation of valve 102.

The cavities 88a and 88b may be closed and isolated by the valve 102, to trap the hydraulic fluid therein and lock vane 94 against rotation, or the cavities may be connected or "shorted" by the valve 102 to allow damped pivoting movement of the vane 94.

A flat electrical sensing coil 112 is diagonally arrayed across the outer surface of rim wall 86 in a central position. Similar flat electrical sensing coils 114 and 116 are arrayed in a diagonal position across the rim wall 86, flanking coil 112, as shown in FIGURE 6A, and all three coils surround casing 78. The casing 78 is formed of non-magnetic material such as aluminum or magnesium alloy or stainless steel, and the vane 94 is provided with an insert 95 formed of a paramagnetic material, such as a stainless steel selected from the 400 series, positioned near rim wall 86. The input coil 112 and read-out coils 114 and 116 form a sensing transformer coupled by the paramagnetic vane insert 95, whose angular position in cavity 88 determines the amount of electrical coupling between the input coil 112 and one or the other of the read-out coils 114 and 116, as indicated in FIGURE 6A. An indication of the position of the vane 94 within the cavity 88 is therefore supplied directly to the control circuitry, and feedback signals may be coupled to the input of the electrically controlled proportional valve 102, to control the angular position and angular velocity of vane 94.

The protruding end of shaft 96 and the casing 78 of the sector actuator 68 shown in FIGURE 6 thus form a precisely-controlled and powerful pivotal actuator, providing predetermined relative pivotal positioning of casing 78 and shaft 96.

Operation of torso assembly

The torso assembly 36 is pre-adjusted to fit the wearer's size by fine adjustment of extensible height adjusters 49 on anchor plate 48, and extensible width adjusters 59 and 61 on rear frame 56 and anchor plate 48 respectively.

Referring again to FIGURE 5, it will be seen that a cross shaft 70 joins the two sidewise sector back actuators 66, whose casings are anchored to the angular waist actuator 54. Cross shaft 70 is formed of two aligned stud shafts joining the vanes of the two actuators 66, and two perpendicular sidewise stud shafts anchored to the vane of actuator 68 and journalled in the ends of a yoke 69. Actuation of the actuators 66 thus provides angular pivoting movement of the cross shaft 70 relative to the waist actuator 54, causing sidewise angular displacement of the entire upper portion of the torso assembly 36 and its associated structures, the two arm assemblies 37 and the head assembly 45, through the extension cylinder 50 and anchor plate 48 joined to the chest strap.

Actuation of the forward sector back actuator 68 moves its casing angularly with respect to the sidewise extending branches of the cross shaft 70, one of which is integrally joined with the actuating vane inside actuator 68. The casing of actuator 68 is anchored to the yoke 69, on which is firmly mounted the cylinder portion of extension cylinder 50, whose piston rod is anchored to the anchor plate 48. Forward tilting actuation of the actuator 68 is combined with extension of cylinder 50 by means of a valve 51 and sensing coil arrangement similar to the units 102, 112, 114 and 116 shown in FIGURE 6, producing simultaneous extension of the piston rod and raising of anchor plate 48 as the anchor plate is tilted forward by actuation of the actuator 68. The automatic extension thus provided by the cylinder 50 compensates for the increasing curvature of the wearer's spine, and extends the torso assembly illustrated in FIGURE 5 to accommodate the amount of forward tilting achieved.

Pivotal shoulder actuators

Both arm assemblies 37 are provided with articulating movement by the operation of the pivotal actuators 62 and 64 shown in FIGURE 5. Each of these actuators takes the form shown in FIGURE 7, with a cylindrical outer casing 118 having two opposite inwardly extending ribs 120 and 122 provided with seals 124 and 126 which are both in sliding contact with a concentric shaft 128. Two opposite vanes 130 and 132 extend radially from shaft 128 toward the inside of the cylindrical outer casing 118, and are provided around their peripheries with seals 134 and 136, which are in sliding contact with the cylindrical outer casing 118 and with its ends walls 138. Each of the vanes 130 and 132 thus divides an interior semi-circular segment of casing 118 into two separate cavities 140 and 142 respectively bounded by the vanes, the cylindrical casing 118, the end walls 138 and the ribs protruding inwardly toward shaft 128 from the inner surface of casing 118.

As shown in FIGURE 7, the vane 130 is adapted to move pivotally about the axis of shaft 128, in response to pressure differentials between the hydraulic fluid in the cavities 140 and 142. A higher pressure in cavity 140 will produce counterclockwise movement of vane 130, for example.

The two cavities 140 are diametrically opposite, each being on the clockwise side of its vane, and both cavities 140 are simultaneously exposed to the same hydraulic pressure, while both cavities 142 are likewise exposed simultaneously to their own same hydraulic pressure, the pairs of cavities 140 and 142 being connected respectively by ports 141 and 143 passing through shaft 128. Gasket seals 139 between the rim of casing 118 and end walls 138 seal cavities 140 and 142. Cavities 140 and 142 may both be closed to prevent movement of the vanes, or they may be connected or "shorted" to permit damped pivoting movement of the vanes. A paramagnetic insert 131 is mounted in vane 130, similar to insert 95 in FIGURE 6.

A proportional valve 144 is positioned outside casing 118 near the rib 120, and pressure supply conduit 104 and exhaust conduit 106 both connect directly with the valve 144. Valve 144 communicates directly with one of the chambers 142 through a port 148 and also with one of the chambers 140 through a port 150. The valve 144 is actuated to supply pressure from conduit 104 through port 148 to chambers 142 while connecting chambers 140 to exhaust conduit 106 via port 150. Alternatively, valve 144 may be closed to isolate chamber 140 and 142 from the supply and exhaust conduits, locking the vanes against pivotal movement, or the valve may be reversed to connect pressure supply conduit 104 to chambers 140 through port 150 while connecting chambers 142 to exhaust conduit 106 via port 148. The pressure differential thus created on the opposite sides of vanes 130 and 132 causes the shaft 128 to pivot in response to any pressure differential between chambers 140 and 142, in the direction and velocity determined by the actuation of the proportional valve 144.

Shaft 128 protrudes through one end wall 138 of the casing 118, and the relative angular movement of protruding shaft 128 and casing 118, caused by actuation of valve 144 and the resulting movement of the vaned unit 128–130–132, produces powerful and precisely controlled actuating force. Furthermore, the speed of movement of the vaned unit depends upon the velocity with which hydraulic fluid travels through ports 148 and 150, and the valve 144 may therefore be regulated for partial closure of the ports, reducing the speed of operation of the actuator. Input sensing coil 152 and read-out sensing coils 154 and 156 are diagonally arrayed on the outer surface of the casing 118 to produce a sensing transformer indicating the precise position of the vane 130 within the casing 118, in the same manner that sensing coils 112, 114 and 116 indicate the position of vane 94 in the actuator 68 of FIGURE 6.

Referring again to FIGURE 5, the actuators 62 and 64 thus provide articulated movement of the arm assembly 37, since the shaft 128 of actuator 62 is integrally joined to the curved shoulder member 158 whose remote end is anchored to the casing of actuator 64. The shaft 128 of actuator 64 is anchored in turn to the upper arm bar 160 forming the structural support for arm assembly 37. Actuation of actuators 62 and 64 thus produces both outward and forward movement of the arm assembly 37.

By comparing FIGURES 6 and 7 it will be noted that the sector actuator of FIGURE 6 is a modified version of the dual or balanced pivoting actuator of FIGURE 7 since the cavities 88a and 88b flanking vane 94 in FIGURE 6 correspond to the cavities 140 and 142 flanking vane 130 in FIGURE 7. In the pivoting actuator of FIGURE 7, however, the vaned unit having radial vanes 130 and 132 diametrically opposed on both sides of a central shaft 128, and each flanked by corresponding cavities 140 and 142, provides a dynamically balanced and compact construction producing maximum torque with minimum loading of the bearings journalling shaft 128. The differing pivotal ranges of the actuators of FIGURES 6 and 7 adapt them respectively for the actuation of linkages over a small pivoting range, in the case of actuator 68 of FIGURE 6, and actuation of linkages requiring pivotal articulation over a range of nearly 180 degrees, as in the case of the hip and shoulder joints of the present invention.

Sensing coils

The orientation of the sensing coils of the sector and pivotal actuators of FIGURES 6 and 7 is illustrated in FIGURES 6a and 7a. Preferably the input coil 112 and the readout coils 114 and 116 for the sector actuator are secured in aligned relationship on a flexible removable band 117 fitted for mounting surrounding the periphery of the sector actuator shown in FIGURE 6. As indicated in FIGURE 6a the sensing coils are positioned in a parallel-line array surrounding the actuator and they extend diagonally across rim wall 86, where they are most closely exposed to the paramagnetic insert 95 in vane 90, shown in dash lines in FIGURE 6a.

As shown in FIGURE 7a the sensing coils 152, 154 and 156 of the pivotal actuator shrown in FIGURE 7 are similarly arrayed diagonally on a flexible removable band 119 fitted for mounting on the periphery of the casing 118 closest to the insert 131 whose position is shown in dashed lines in FIGURE 7a, at three positions of vanes 130, its two extreme positions and a central position. The insert 95 of vane 90 in the actuator of FIGURE 6 is similarly indicated in dashed lines in FIGURE 6a in three comparable positions of its travel.

Hip and thigh assembly

The hip and thigh assembly 38 shown in FIGURES 2 and 3 and illustrated in more detail in FIGURE 8 exemplifies the limb supporting and actuating sub-assemblies incorporated in the systems of the present invention. The hip and thigh assembly is joined to the rear frame 56 by the outward pivotal hip actuator 58, shown in FIGURES 5 and 8, whose shaft 128 is anchored integrally in the lower corner of rear frame 56, and whose casing 118 is anchored to a hip member 162, a curved structural bar partially encircling or cradling the wearer's hip and having its remote end anchored to the casing 118 of forward pivotal hip actuator 60. The shaft 128 of actuator 60 is anchored in turn to the upper thigh bar 164, the structural member joining the arrayed leg and foot assemblies to the torso assembly, and furnishing upright structural support for the upper assemblies of the system, including the torso, head and arm assemblies.

A cushioned strap 76 anchored to thigh bar 164 is adapted for secure and removable encirclement of the wearer's thigh, as indicated in FIGURE 8. The lower end of upper thigh bar 164 is firmly anchored on the upper track 166 of angular high actuator 168, whose lower track 170 in turn is anchored securely to two lower thigh members 172, each of whose lower ends is individually anchored to the casings 118 of one of the two pivotal knee actuators 174, which are similar to actuator 64 shown in FIGURE 7. Interposed part way along the length of lower thigh member 172 are two additional units, a shock absorber 176 and an extensible length adjuster 178 permitting extension or retraction of the lower thigh member 172 to accommodate wearers of different heights. The shock absorber 176 is a spring-actuated or hydraulic shock absorber of standard type or a resilient-mass type cushioning member acting to cushion the jars of walking or sudden impacts encountered during operation of the system.

Angular actuators

The angular actuator 168 is generally similar to the waist actuator 54 and the neck actuator 74 since each of these devices provides sliding relative movement of two arcuate concentric members, achieving swiveling or twisting of the leg, the waist or the neck of the wearer. Angular actuator 168 is illustrated in the two perspective views of FIGURES 9 and 10, where the co-acting operation of its various elements is indicated. Upper track 166 is concentrically arranged inside and above the lower track 170, and the two tracks are engaged for sliding concentric relative angular movement by such means as the roller bearings 180 and 182, arranged in two or more parallel rows around the periphery of the arcuate track 166 and 170 and interposed in rolling contact therebetween.

As shown in FIGURE 9, the two rows of bearings 180 and 182 are each positioned with their central races fitted on radial studs protruding inwardly from the inner surface of the lower track 170, while their outer races are engaged in rolling contact with opposite grooves in an outwardly protruding central flange 184 of the upper track 166. Two opposed rows of the roller or ball bearing units engaging the outwardly protruding flange 184 of the upper track 166 between their opposed outer races provide smooth and quiet rolling contact for the relative angular movement of the tracks 166 and 170, with firm support of the upper track 166 by the lower track 170 even when maximum angular relative displacement has projected the flange 184 to an extreme end position, with only one end of the flange 184 being positioned between the opposed roller bearings 180 and 182, leaving a portion of track 166 unsupported by bearings 180 and 182, as shown in FIGURE 10.

The hydraulic piston and cylinder assembly shown at the bottom of FIGURE 9 provides the actuating force to cause relative angular movement of the tracks 166 and 170. The curved cylinder 186, integral with lower track 170, has an arcuate centerline axis with a circular curvature concentric with the common axis of concentric tracks 166 and 170. Cylinder 186 and its piston 188 are shown with a rectangular cross section for ease of construction, although any suitable shape may be used. Piston 188 is surrounded by a sealing piston ring 189 slidingly fitted inside cylinder 186, and the piston is loosely pinned to a curved piston rod 190, which passes through a packed aperture in the head of cylinder 186 and is anchored to upper track 166.

Sensing coils 192, 194 and 196 surround cylinder 186, operating in the same manner as coils 112, 114 and 116 of FIGURE 6, in co-operation with a paramagnetic insert mounted in or moving with piston 188, which may be the piston rod link 191, for example.

The respective ends of cylinder 186 are blocked or connected together or to hydraulic pressure conduit 104 and hydraulic exhaust conduit 106 by a proportional valve 197, causing either locking, damped drifting, or actuation of piston 188 relative to cylinder 186, producing the desired relative angular movement of tracks 166 and 170, governed by the control circuits by way of sensing coils 192, 194 and 196.

It will thus be seen that the hip and thigh assembly 38 incorporates both structural members and actuators allowing the assembly to transmit the weight of the wearer while enabling him to move the assembly both forwardly pivoting about the actuator 60 and outward or sideways pivoting about the actuator 58 as well as providing angular actuation to permit twisting of the wearer's thigh by the angular actuator 168.

Neck actuator 74, waist actuator 54 and the other angular actuators of the system are all generally similar to actuator 168, described above.

Each angular actuator, or the associated structure of its assembly, is provided with equilibrium sensors 256 and 258, such as those shown mounted on the lower track of actuator 54 in FIGURE 5, and described in detail below.

Knee and calf assembly

The lower thigh members 172 have their lower ends, beneath shock absorber 176 and length adjuster 178, anchored to respective rearward pivotal knee actuators 174 similar to the actuator shown in FIGURE 7, there being a knee actuator 174 at each side of the knee having a protruding shaft secured to an upper calf member 200.

The two upper calf members 200 have their lower ends secured to the upper track 202 of the angular calf actuator 204, similar to the actuator shown in FIGURES 9 and 10, whose lower track 206 supports the lower calf members 208. It will be seen in FIGURE 11 that the upper calf members 200 and the lower calf members 208 extend alongside the wearer's calf from the knee actuators 174 to the region of the wearer's ankles, where the bases of lower calf members 208 are respectively secured to sector ankle actuators 210. Between the angular calf actuator 204 and the sector ankle actuators 210, the lower calf members incorporate shock absorbers 176 positioned near the ankle actuators 210 and extensible length adjusters 178.

One of the lower calf members 208 also carries a valve plate 212 mounting three hydraulic servo valves to actuate the various parts of the foot assembly, isolated from the shocks encountered by the foot assembly by being mounted above shock absorber 176.

Adjustable ankle and foot assembly

The ankle assembly 42 and foot assembly 44 are shown in their co-operative relationship, secured to the ankle actuators 210, in the views of FIGURES 12, 13 and 14. The two aligned shafts of the ankle actuators 210 are respectively anchored to opposite ends of an ankle yoke 214 encircling the rear of the wearer's ankle and having its mid-section joined in turn to a rearwardly extending shaft of a heel actuator 216.

Both the ankle actuators 210 and the actuators 216 are pivotal sector actuators of the kind illustrated in FIGURE 6, and each heel actuator 216 provides sidewise tilting movement for the foot assemblies 44 relative to the calf assemblies 40. The casing of each heel actuator 216 is anchored to a heel height adjuster 218 through which the shaft of actuator 216 is journalled before reaching the ankle yoke 214, and the adjuster 218 is secured in adjustable engagement with a base plate 220 of the foot assembly 44 by means of a reversely threaded turnbuckle-type connector 222, aligned by sliding parallel alignment pins 223. Adjustment of connector 222 positions the axis of ankle actuator 210 the proper distance above the base plate 220 to accommodate the ankle height of the wearer's foot.

The base plate 220 of foot assembly 44 is provided with a forward portion 224 having an overlapping telescoping connection with the forward end of the casing 220, and a toe casing 226 is pivotally joined to the forward edge of the forward portion 224 by means of a horizontal lower hinge 228, permitting upward pivoting of the toe casing 226 relative to the base plate 220–224. A toe sector actuator 230 having its casing anchored to the toe casing 226 and its actuator shaft anchored to the forward portion 224 of the foot assembly base plate 200 provides upward tilting movement of the toe casing 226 upon command.

A slidable heel socket 232 is slidably mounted for movement in a forward and backward direction in suitable guides within the base plate 220, and forward and backward adjustment of the heel socket 232 and the telescoping forward portion 224 of the base plate 220 is provided by two adjusting screws 234 and 236 running lengthwise under the wearer's foot in suitable threaded fittings in the lower members of the foot assembly 44 and adjustable from the rear end of the base plate 220, as shown in the view of FIGURE 14. In FIGURE 12 for example, the heel socket 232 is shown to have a downwardly protruding flange 238 fitting within an inner recess 239 of base plate 220. Flange 238 is provided with a threaded aperture engaging a threaded portion of the adjusting screw 234, which has a second, reversely-threaded portion engaged in an aligned threaded aperture in casing 220 ahead of the recess and the flange 238, and providing turnbuckle-type forward adjustment of heel socket 232 upon turning of the heel adjustment screw 234. The forward portion of the screw 234 forms an unthreaded aligned tube telescoped within an alignment guide aperture 240 in the forward portion 224.

The forward portion adjusting screw 236 is similar to the heel adjusting screw 234, but its alignment tube and reversely-threaded turnbuckle portions are reversed, the threaded portions being in respective engagement with the forward and rear portions of the casing 220–224 to cause their sliding telescoping adjustment, while the alignment tube portion of screw 236 fits in a suitable alignment aperture in the rear portion of base plate 220 and the heel socket 232 to maintain these elements in alignment.

Head assembly

While many embodiments of the systems of this invention do not require a protective head covering, fire-fighting suits and other systems for use in smoke fumes or noxious atmospheres require complete enclosure for the wearer's body and head, with a self-contained atmosphere modified by heating and air conditioning or refrigeration. In such systems, as shown in FIGURE 5, a protective head covering or helmet 242 is mounted enclosing and supported by the head assembly 45. A pair of forward pivotal actuators 244 have their casings anchored to an upper track 246 of angular neck actuator 74, whose lower track 248 is secured to the anchor plate 48. The shafts of actuators 244 are joined to a head yoke 250 encircling the back of the wearer's head, which supports the helmet 242 via lateral pivotal actuator 252 and its helmet plate 254. Actuation of the actuators 244, 252 and 74 thus provides substantial angular movement of helmet 242 in all directions.

Arm assemblies

The arm assemblies are generally similar to the leg assemblies, with the shoulder, upper arm, elbow and forearm mechanisms corresponding to the hip, thigh, knee and calf mechanisms already described in detail.

Wrist and gripping hand mechanisms (not shown) are generally similar to the ankle and foot assemblies, with the gripping hand assemblies being constructed as required for the seizing, gripping, lifting or manipulating functions required of the particular system.

Equilibrium control

The systems of this invention are provided with gravity-responsive level-sensors positioned to indicate tilting movement of each independent supporting assembly, calf assembly 40, thigh assembly 38, rear frame 56 and anchor plate 48.

As shown in FIGURE 1, the system's actuation sectors may be reduced to three datum planes defined by the three mutually perpendicular axes intersecting at an origin O at ground level directly beneath the wearer's center of gravity: a lateral X-axis, on which $+X$ is to the right and $-X$ to the left, a vertical Z axis on which $+Z$ is upward and $-Z$ is downward, and a fore-and-aft Y axis on which $+Y$ is forward and $-Y$ is to the rear. These axes thus define a dorsal, Y-Z plane, a lateral X-Z plane and a horizontal X-Y plane.

As shown in FIGURE 10, two equilibrium sensors are incorporated in the hip and thigh assembly 38, a lateral sensor 256 and a forward sensor 258. The lateral sensor 256 is a slightly upwardly curved, sealed tube partially filled with a liquid electrolyte and sensing electrodes 260 penetrate each end of the tube, with an upper central electrode 262 completing the sensing circuit by contacting the electrolyte. Tilting of the sensor in the plane of its curvature causes the electrolyte to move to the lower end of the tube, increasing the conduction of the lowered electrode 260 of the sensor while reducing that of the electrode at the raised end, because of the changed degree of immersion of the end sensing electrodes 260.

Lateral sensor 256 thus indicates the occurrence and the amount of tilting departures of the hip and thigh assembly laterally from the dorsal, Y-Z plane, whether caused by intended actuation of the system or by external influences, such as high winds.

Dorsal equilibrium sensor 258 similarly detects tilting departures from the lateral, X-Z plane, and the pair of sensors 256 and 258 thus indicates the kind and amount of any tilting departure from static equilibrium, supplying servo-actuating information to the control system, which accordingly applies restoring actuation of the appropriate actuators, or employs the equilibrium information to control the programmed actuation of the entire system.

In addition to those on each hip and thigh assembly 38, similar pairs of actuators 256 and 258 are mounted on the anchor plate 48, the rear frame 56, and each knee and calf assembly 40, supplying ample equilibrium information to the control system from all parts of the operating structure.

Locomotion control

The control system shown schematically in the block diagram FIGURE 4 includes an equilibrium control circuit 264 and a locomotion control circuit 266, both of which receive signals from the equilibrium sensors and from a memory storage circuit 268. In addition, command signals are applied by the wearer's operation of control unit 30, or by similar remote control signals.

For example, a control signal commanding forward walking movement calls forth a programmed series of actuations of the various actuators from the memory storage circuit 268, and the speed and amplitude of each actuation is selectable by the wearer.

The selected series of actuations is supplied by the locomotion control circuit 266 to the various actuators involved subject to equilibrium correction signals from the Equilibrium Control Circuit 264, and thus moving the leg, foot, torso and arm assemblies to maintain equilibrium while the wearer is moved forward in a substantially normal walking manner. Similar programs for sidewise steps, backward steps and upslope or downslope locomotion are stored in the Memory Storage Circuit 268, and evoked by appropriate initiating control signals.

Discontinuities in terrain, such as flights of steps, boulders, chasms or obstructions are sensed and analyzed by a group of terrain sensors 270 (FIGURE 1) operated by sound, light, infrared or other radiation and sensitively responsive to the position and size of obstructions or drop-offs in the terrain ahead of the wearer.

Proximity control circuit

Terrain sensors 270 supply forward obstruction and drop-off proximity information to a Forward Proximity Control Circuit 271 adapted to detect significant terrain discontinuities, scan the terrain for alternative paths via sensors 270, and direct locomotion along a suitable alternative path which avoids significant discontinuities and obstructions.

Ground proximity sensors 272 are mounted on the bottom, sides, front and rear of each foot assembly 44, as shown in FIGURES 12–15. These may be capacitive or other sensors responsive to the proximity of the ground below and around the foot assemblies. Sensors 272 thus provide vital warnings of local, small terrain discontinuities or obstructions, such as a flight of steps or the like, to a Ground Proximity Control Circuit 273 (FIGURE 4), which initiates actuation, co-ordinated with Forward Proximity Control Circuit 271 to avoid or compensate for such obstructions.

Weight distribution sensors

Compressive strain gages 274 are mounted inside the heel socket 232 and the base plate 220, and are responsive to the load of the wearer's weight. Gages 274 thus supplement bottom proximity sensors 272 in the indication of the proportion of the wearer's weight being borne by each foot assembly 44, and gages 274 are further useful in monitoring the effectiveness of the system's structural support of the wearer's weight. If the wearer should be suffering from a broken leg, incapable of bearing his weight, the system can be adjusted to carry the entire weight of the injured leg, and gages 274 will assure the effectiveness of this support.

Imbalance compensator control

A plurality of strain gages 275 (FIGURE 5) are mounted on the torso assembly 36, positioned to sense physical elongations of the system's structural elements produced by external loads carried by the wearer via the system, such as a back-pack, a shoulder load, or a hand-held load.

Gages 275 supply information to an Imbalance Compensator Control Circuit 276 (FIGURE 4), assuring that the Equilibrium Control Circuit 264 incorporating balance sensors 256 and 258 is correctly compensated for temporary unbalance loads affecting the equilibrium of the system.

Circuit 276 may also provide warning signals in response to physical overloading of the system if such temporary loads approach structural design limit loads. Similar gages 275 may also be mounted on the other assemblies of the system to indicate unbalanced loads and overloading producing structural stresses elsewhere in the various structures of the system.

Local or remote control

The Main Control Circuit 277 governs selection of information from Memory Storage Circuit 268, and converts it to actuating signals applied to the actuator valves through Equilibrium Control Circuit 264, a Safety Control Circuit 278 and the Locomotion Control Circuit 266.

The Safety Control Circuit 278 provides "fail-safe" signals actuating the various actuators to lower the wearer to the ground gently in the event of failure of the power supply, control, or other vital elements of the system.

Main Control Circuit 277 is directed either by local control unit 30 (FIGURE 1), preferably incorporating a universal stick-type control rod providing convenient and sensitive selection of the direction and velocity of Locomotion and other actuations, or by a remote control station 279 receiving suit information and providing control signals by way of a video-audio transceiver 280 connected to Main Control Circuit 277.

In addition to locomotion, the Control Circuit 277 initiates other system operations, such as lifting, pushing, hauling or kneeling, by supplemental control circuitry.

Electrical and hydraulic power

The power supply unit 32 includes a storage battery 281 supplying D.C. power to a solid state oscillator converter 282 delivering A.C. power at a frequency of 400 c.p.s. or more to the stator windings of an A.C. motor 284, whose rotor drives the hydraulic pump 34. The rotor 284 also incorporates a fixed secondary winding 286 employing the stator core of motor 284 as a transformer core, and providing A.C. power to the other parts of the system, as shown in FIGURE 4.

Pump 34 supplies high-low temperature hydraulic fluid under pressure through its output conduit direct to a heat-transfer heating coil 288 surrounding battery 281.

An external radiator cooling coil 289 (FIGURE 1) mounted on the outside of the suit is connected in series with a thermostat-controlled by-pass valve 290, which opens when ambient temperatures make heating of battery 281 unnecessary, and when cooling of the hydraulic fluid by external radiation from coil 289 is required. Optimum operating temperatures for the storage battery 281 are thus generally maintained in the neighborhood of 150° F. An additional safety by-pass valve 291 connects the inlet and outlet conduits of pump 34.

Hydraulic fluid leaving by-pass 289–290 and heating coil 288 is delivered directly to one or more accumulators 292, preferably mounted on the outer side of the thigh assembly 38, incorporating a safety by-pass 293 responsive to input pressures exceeding a predetermined value. Hydraulic fluid thence passes to a pressure regulator 294, governing and maintaining the hydraulic pressure in supply conduit 104 leading to the actuators of the various sub-assemblies at a predetermined value, between 1,000 and 2,000 p.s.i., for example. The fluid returns from the actuators through return conduit 106 to pump 34.

It will thus be seen that this invention provides self-contained, self-powered personnel support systems capable of support, protection and rescue of personnel active in hazardous environments. These systems provide upright structural support and maintain the upright equilibrium of the wearer, and provide enhanced or supplemental powered actuation of his limbs and extremities to aid his active performance in and his escape from hostile environments. They are capable of functioning even when the wearer is unconscious or has suffered disability or loss of function, because of their self-programming and their remote control capabilities.

While the objects of the invention are efficiently achieved by the preferred forms of the invention described in the foregoing specification, the invention also includes changes and variations falling within and between the definitions of the following claims.

I claim:

1. Personnel support apparatus for supporting the body of a wearer in a stable upright position and providing predetermined movements of his limbs while maintaining his upright equilibrium comprising, in combination,
   A. an articulated structural framework adapted for cradling the body of the wearer and incorporating pairs of independent foot, calf and thigh assemblies, and a torso assembly,
      (1) successively joined together by powered pivotal actuators incorporating means alternatively locking the adjacent assemblies in selected angular relationship, and power means providing predetermined amounts and velocities of relative pivotal movement therebetween,
      (2) each said assembly being adapted to be positioned adjacent the respective body members of the wearer and to be firmly secured thereto to provide structural reinforcement thereof;
   B. and a balancing system incorporating
      (1) at least one pair of equilibrium sensors mounted on each calf assembly, on each thigh assembly, and on the torso assembly, each pair of sensors including a lateral sensor responsive to lateral departures from vertical equilibrium, and a dorsal sensor responsive to forward or backward departures from vertical equilibrium,
      (2) and powered equilibrium control circuit means connecting the sensors to the actuators, for initiating movement of the actuators to correct the sensed departures in response to signals from the sensors.

2. Personnel support apparatus for supporting the body of a wearer in a stable upright position and providing predetermined movements of his limbs while maintaining his upright equilibrium comprising, in combination,
   A. an articulated structural framework adapted for cradling the body of the wearer and incorporating pairs of independent foot, calf and thigh assemblies and a torso assembly,
      (1) successively joined together by powered pivotal actuators incorporating means alternatively locking the adjacent assemblies in selected angular relationship, and power means providing predetermined amounts and velocities of relative pivotal movement therebetween,
      (2) each said assembly being adapted to be positioned adjacent the respective body members of the wearer and to be firmly secured thereto to provide structural reinforcement thereof,
      (3) and each said assembly incorporating an angular actuator having a powered actuating mechanism joining two concentric arcuate tracks movably engaged together for relative angular displacement to provide twisting reorientation of the wearer's body member cradled therein;
   B. and a balancing system incorporating
      (1) at least one pair of equilibrium sensors mounted on each calf assembly, on each thigh assembly, and on the torso assembly, each pair including a lateral sensor responsive to lateral departures from vertical equilibrium, and a dorsal sensor responsive to forward or backward departures from vertical equilibrium,
      (2) and a powered equilibrium control circuit connecting the sensors to the actuators, and initiating movement of the actuators to correct the sensed departures in response to signals from the sensors.

3. The combination defined in claim 1 wherein the articulated structural framework also includes arm assemblies adapted for cradling and providing structural reinforcement for the wearer's arms, joined to the torso assembly by powered pivotal actuators.

4. The combination defined in claim 3 wherein the thigh assemblies and the arm assemblies are joined to the torso assembly by respective pairs of powered pivotal actuators providing controlled pivoting movement about different pivoting axes.

5. The combination defined in claim 1 wherein the actuators are powered by hydraulic driving units formed of non-magnetic materials, having a plurality of electrical sensing coils adjacently arrayed and variably coupled by a paramagnetic member mounted on a reciprocable driven element of the driving unit.

6. The combination defined in claim 1 including a self-contained electrical power supply connected to provide driving power to the actuators.

7. The combination defined in claim 6 including electrical control and memory storage circuits presenting alternative predetermined series of actuating programs, adapted to be selectable by the wearer, and means responsive to the selected program governing the movement of each actuator and adapted to produce a programmed succession of articulated movements of the apparatus upon command.

8. The combination defined in claim 7 wherein the series of actuating programs includes a forward locomotion program wherein the articulated assemblies of the apparatus are successively moved to produce substantially normal forward walking movement of the wearer.

9. The combination of claim 7 including remote control means operatively connected with the apparatus to select, initiate and change actuating programs by remote command.

10. The combination defined in claim 7 including proximity sensors responsive to the presence and absence of objects near the apparatus, producing output signals delivered to the electrical control and memory storage circuits to initiate changes in the actuating program selected as required by the presence or absence of the objects sensed.

11. The combination defined in claim 1 wherein the articulated structural framework is enclosed in an openable jacket forming a protective suit adapted to surround the wearer's torso and limbs.

12. The combination defined in claim 1 wherein the torso, thigh and calf assemblies are each divided into upper and lower sections, and each incorporate arcuate angular actuators interposed integrally within their structures, each angular actuator including,
   A. a first arcuate track joined to the upper section and a second concentric arcuate track joined to the lower section,
   B. low-friction movable means interposed between the concentric arcuate tracks to provide relative angular movement of the tracks while holding them in concentric axial alignment,
   C. and a powered, extensible, arcuate actuation means joining the arcuate tracks and alternatively locking the tracks in selected angular relationship, and providing predetermined amounts and velocities of relative angular movement therebetween.

13. A structural sub-assembly for a personnel supporting apparatus, adapted for cradling and providing structural support for a human body member, comprising in combination, upper and lower structural sections connected by an angular actuator including
   A. a first arcuate track joined to a lower end of the upper structural section and a second concentric arcuate track joined to a juxtaposed upper end of the lower structural section,
   B. low-friction movable means interposed between the concentric arcuate tracks to provide relative angular movement of the tracks while holding them in concentric axial alignment,
   C. and a powered, extensible, arcuate actuation means joining the arcuate tracks and alternatively locking the tracks in selected angular relationship, and providing predetermined amounts and velocities of relative angular movement therebetween.

14. The structural subassembly defined in claim 13, including powered pivotal actuator means positioned at the free end of one of said structural sections opposite to the juxtaposed ends thereof and adapted for joining the sub-assembly movably to an adjoining structure, with one of said structural sections also incorporating compressible shock absorbers to minimize the transmission of shock loads by the sub-assembly.

15. The sub-assembly defined in claim 14 wherein one of said structural sections includes extensible adjusting means for lengthening and shortening the maximum overall dimension of the sub-assembly.

16. An arcuate angular actuator interposed integrally within a dual structure having an upper structural section and a lower structural section, comprising in combination,
   A. a first arcuate track joined to a lower end of the upper structural section and a second concentric arcuate track joined to a juxtaposed upper end of the lower structural section of the dual structure,
   B. rolling means interposed in rolling engagement between the concentric arcuate tracks for relative angular movement of the tracks,
   C. and a powered, extensible, arcuate actuation means joining the arcuate tracks and alternatively locking the tracks in selected angular relationship, and providing predetermined amounts and velocities of relative angular movement therebetween.

17. A powered angular actuator for joining, and providing controlled angular relative movement and relative positioning of, adjacent structural members comprising, in combination,
   A. a casing adapted to be connected to one structural member,
   B. a movable element secured in angularly movable engagement with the casing and adapted to be joined to the adjacent structural member,
   C. and a hydraulic driving unit incorporating means forming a cavity in the casing, a sweeping member joined to the movable element and movably positioned to sub-divide the cavity into two cavity-portions and to sweep the cavity from one terminal position to another, and fluid valve-port means selectively isolating and connecting the cavity-portions to each other, to a fluid pressure conduit and to a fluid exhaust conduit, creating pressure differentials between the cavity-portions impelling the sweeping member and movable element into angular movement relative to the casing,
   D. with an output coil being mounted on the casing diagonally arrayed in juxtaposition with the path of the sweeping member as it moves between its terminal positions,
   E. with an input coil mounted on the casing adjacent to the output coil and to the path of the sweeping member,
   F. and with the sweeping member being provided with means operative to change the electrical characteristics linking the input coil to the output coil in a manner varying as a function of the angular position of the sweeping member relative to the diagonally arrayed output coil,
   G. and control circuitry means operatively connected to the input coil and the output coil.

18. A powered angular actuator for joining adjacent structural members while providing controlled relative angular movement and positioning thereof comprising, in combination,
   A. a fluid-tight hollow casing having an internal cavity,
   B. a shaft spanning the cavity and having its ends journalled in opposite walls of the casing with one end protruding externally from the casing through a packed bearing aperture,
   C. a vane radially extending from the shaft positioned to sweep across the cavity upon angular pivoting relative movement of shaft and casing,
   D. sealing means interposed between shaft, vane and casing to divide the cavity into substantially fluid-tight cavity-portions flanking the vane,
   E. and controlled valve-port means alternatively connecting the cavity-portions together, isolating them, and connecting them respectively to a fluid pressure conduit and a fluid exhaust conduit, one cavity-portion being selected for connection to the fluid pressure conduit, and a velocity and time period of flow through the valve-port means being selected, to provide a predetermined direction, velocity and amount of relative angular pivotal movement of shaft and casing,
   F. and the shaft and casing being adapted to be joined respectively to the adjacent structural members, providing the desired relative angular movement and positioning thereof upon actuation of the valve-port means,
   G. with sensing transformer coil means
      (1) mounted on the casing and diagonally arrayed in juxtaposition with the sweeping path of movement of the vane,
      (2) having an electrical characteristic varying in response to the angular position of the vane in the cavity, and
      (3) electrically connected to control circuit means operatively adapted to govern the operation of the controlled valve port means.

19. The actuator of claim 18 wherein the cavity is sector-shaped, with the shaft being positioned near its apex.

20. The actuator of claim 18 wherein the cavity is circular, with the shaft being positioned at its center, and with at least two radial vanes extending from the shaft, each flanked by cavity-portions separated from each other by casing partitions projecting into the cavity toward the shaft.

21. A foot sub-assembly for personnel support apparatus incorporating
   A. a foot-cradling base plate having a rear portion and a telescoping forward portion slidably movable forwardly and rearwardly in the rear portion,
   B. and a toe-cradling toe casing pivotally joined by a powered pivotal actuator to the forward end of the forward portion,
   C. and powered universal actuator means adapted for joining the rear portion to adjacent structural members of the personnel support apparatus.

22. A torso sub-assembly for personnel support apparatus comprising in combination,
   A. a rear frame adapted for cradling the wearer's waist and hips,
   B. an anchor plate adapted to be positioned behind the wearer's shoulders and secured to the wearer's body,
   C. extensible length adjusting means mounted on the anchor plate,
   D. and powered actuator means connected to a universally-pivoting crossed-axis coupling joining the rear frame to the anchor plate in universally articulating movable relationship.

References Cited

UNITED STATES PATENTS

| | | | |
|---|---|---|---|
| 2,198,871 | 4/1940 | Haboush | 128—84 |
| 2,465,585 | 3/1948 | Ganoe et al. | 3—2.1 |
| 2,474,200 | 6/1949 | McBee | 128—87 |
| 3,034,131 | 5/1962 | Lent | 128—283 X |
| 3,038,275 | 6/1962 | Curci | 46—247 |

FOREIGN PATENTS 55,973   10/1912   Austria.

LAWRENCE W. TRAPP, *Primary Examiner.*